(12) United States Patent
Guetta et al.

(10) Patent No.: US 7,710,294 B2
(45) Date of Patent: May 4, 2010

(54) FOR EXTERNALLY CLOCKED DIGITAL AUDIO INPUT, DETERMINING A VALID CLOCK AND MUTING AUDIO DURING SYNCHRONIZATION

(75) Inventors: Anthony Guetta, Palo Alto, CA (US); Raymond Montagne, Cupertino, CA (US); Matthew Xavier Mora, Fremont, CA (US)

(73) Assignee: Apple Inc., Cupertino, CA (US)

( * ) Notice: Subject to any disclaimer, the term of this patent is extended or adjusted under 35 U.S.C. 154(b) by 714 days.

(21) Appl. No.: 11/551,010

(22) Filed: Oct. 19, 2006

(65) Prior Publication Data

US 2008/0143566 A1    Jun. 19, 2008

(51) Int. Cl.
*H03M 7/00* (2006.01)
(52) U.S. Cl. .......................................... 341/50; 341/51
(58) Field of Classification Search ................... 341/50, 341/51, 155, 144
See application file for complete search history.

(56) References Cited

U.S. PATENT DOCUMENTS

| 4,232,393 | A |   | 11/1980 | Kumaoka |
| 5,245,667 | A |   | 9/1993 | Lew |
| 5,266,908 | A | * | 11/1993 | Koulopoulos et al. .......... 331/2 |
| 5,473,615 | A | * | 12/1995 | Boyer et al. ................ 714/704 |
| 7,155,289 | B1 |  | 12/2006 | Hartley |
| 2006/0095623 | A1 |  | 5/2006 | Nio |
| 2007/0146550 | A1 |  | 6/2007 | Ikuma |

\* cited by examiner

*Primary Examiner*—Jean B Jeanglaude
(74) *Attorney, Agent, or Firm*—Gazdzinski & Associates, PC

(57) ABSTRACT

Methods and apparatus for determining the existence of an external clock over a digital input port on a computer. In one embodiment, the external clock is validated, and a lock is performed when the clock is valid. Whenever a loss of the lock is detected, and, if a re-lock is likely, the apparatus is muted so that audio artifacts that would otherwise be heard are minimized. The methods and apparatus also provide automatic re-locking to the external clock when a sampling rate change is detected.

27 Claims, 3 Drawing Sheets

FOR EXTERNALLY CLOCKED DIGITAL AUDIO INPUT, DETERMINING A VALID CLOCK AND MUTING AUDIO DURING SYNCHRONIZATION

FIELD

The present invention relates broadly to digital input in a computer device. Specifically, the present invention relates to clock synchronization in a device that supports digital audio input.

BACKGROUND

I2S, or Inter-IC Sound, or Integrated Interchip Sound, is an electrical serial bus interface standard used for connecting digital audio devices together. It is most commonly used to carry PCM information between the CD transport and the DAC in a CD player. The I2S bus separates clock and data signals, resulting in a very low jitter connection. Jitter can cause distortion in a digital-to-analog converter. The bus consists of at least three lines: a bit clock line, a word clock line (also called word select line) and at least one multiplexed data line.

Computers such as notebooks and other portable devices are gaining popularity among users for sound recording and playback, making I2S more popular among such devices. On some machines that support sound recording in the form of digital input, the digital input has been run off either a clock internal to the device, or off of the a clock derived from the external digital input signal itself. However, on these machines, there are often limitations of running off of an external clock only because the internal clock has been taken away and used for another requirement in the device.

This creates the problem of dynamically determining the existence of a valid external clock, and whether or not the digital input hardware on the device can use the external clock. While hardware solutions for this problem can be implemented, such implementations add complexity and cost to devices and are less desirable than a software implementation.

SUMMARY

The present invention provides a method and apparatus for determining the existence of an external clock over a digital input port on a computer, and, if the external clock is valid, locking to it. A loss of the lock can also be detected, and, if a re-lock is likely, the computer system is muted so that audio artifacts that would otherwise be heard are minimized. The computer system of the present invention automatically re-locks to the external clock if the clock has changed, as in the case of a change in sampling rate.

BRIEF DESCRIPTION OF THE DRAWINGS

Many other features and advantages of the present invention will be realized upon reading the following detailed description, when considered in conjunction with the accompanying drawings, in which.

DETAILED DESCRIPTION

Figure 1:
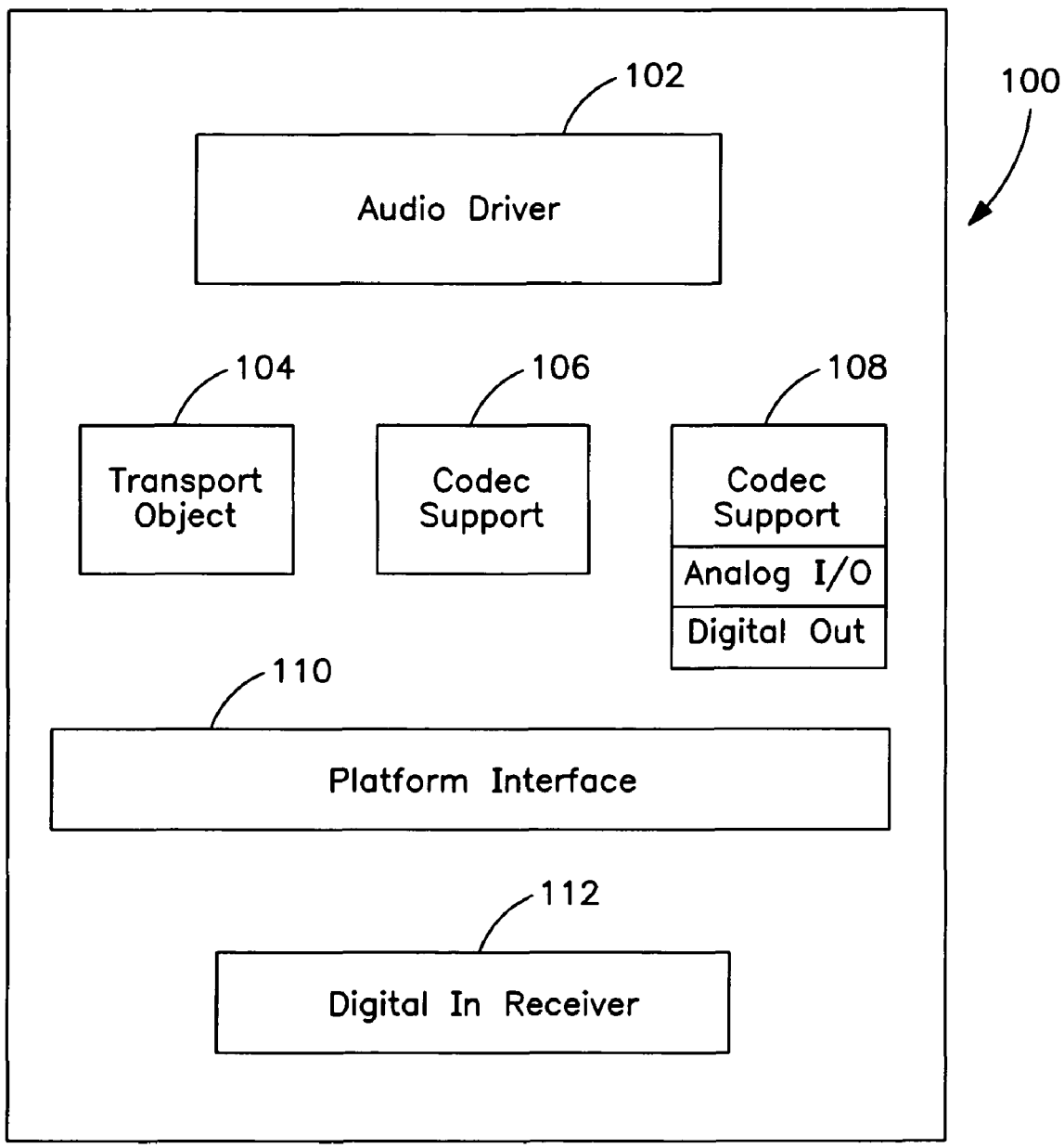
FIG. 1 illustrates the architecture of an embodiment of the present invention.

FIG. 1 illustrates an exemplary architecture of system 100 in accordance with the present invention. Directing attention to FIG. 1, system 100 includes audio driver 102 that has a polling mechanism and timer capabilities to communicate messages related to clock lock/unlock conditions. Audio driver 102 also controls transport object 104 and codec support module 106 as well as codec support module 108. Codec support module also handles analog input and output as well as digital output for system 100. Transport object 104, codec support module 106 and codec support module 108 are in communication with platform interface 110, which coordinates communication between the software components of system 100 and the hardware components of system 100.

On the hardware side of system 100, digital input receiver 112 contains a register that holds the ratio of the output master clock (OMCK) to the recovered master clock (RMCK). When this ratio value is within an acceptable range, it is possible that a valid external clock signal is present. The stability of this clock ratio value is measured. When system 100 first starts, or after it wakes from sleep, the OMCK/RMCK clock ratio is cached as an anchor measurement. Periodically, for example once per second, the current clock ratio is read. If the difference between the current ratio and the cached ratio is within a certain threshold, for example a variation of one bit, it is assumed that there exists a valid clock and the system 100 locks to it. However, if a step is detected in the ratio value, it is assumed that an unlock condition has occurred. At the end of each ratio step test, the current ratio is written to the cached ratio value. Thus, the rate of change of the clock ratio is approximated over time.

If a ratio step is detected, and one of the step endpoints corresponds to a valid ratio, this may indicate a change in the input signal sampling rate. In this case, it is assumed that a re-lock is pending, and system 100 is muted until a re-lock occurs. Muting system 100 minimizes audible artifacts. If the re-lock does not occur within a threshold number of poll cycles, such as three polling cycles, it is assumed that a re-lock is not likely to occur and the mute placed on system 100 is withdrawn.

Figure 2:
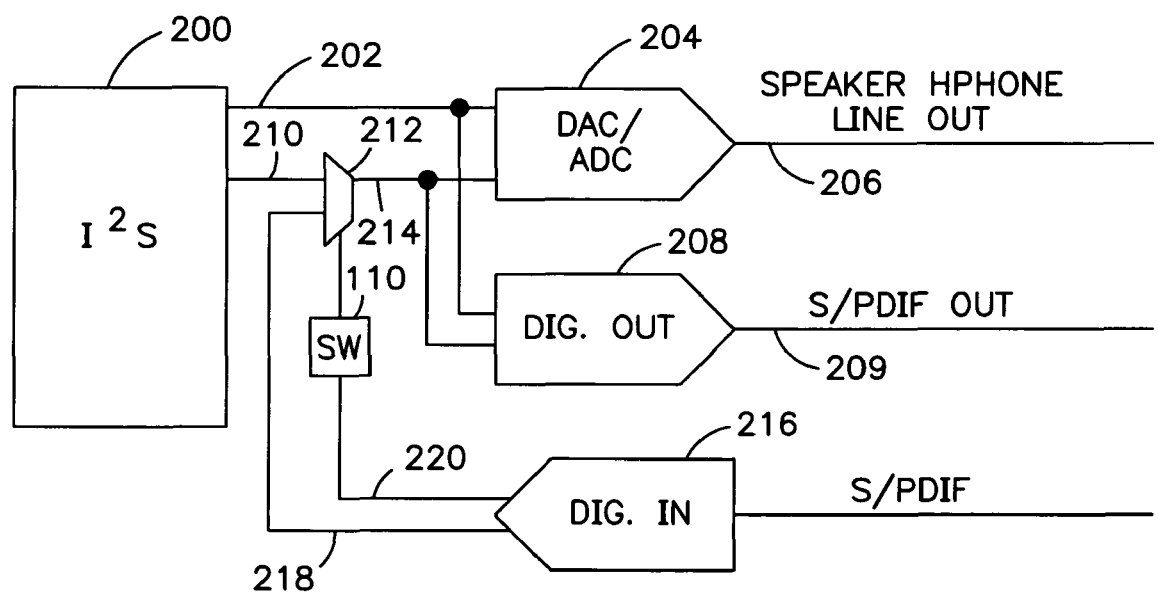
FIG. 2 illustrates hardware utilized in an embodiment of the present invention.

Directing attention to FIG. 2, system 100 is shown having an I2S processor 200 with two lines out is shown. Line 202 connects to digital to analog and/or analog to digital converter 204, to which line out 206 is connected. Line 202 also connects to digital out module 208, to which S/PDIF line out 209 is connected. Line 210 passes to multiplexer 212, which in turn is connected via line 214 to converter 204 as well as digital out module 208. Digital in module 216, containing digital input receiver module 112, has a first line 218 and a second line 220, both connecting to multiplexer 212.

Figure 3:
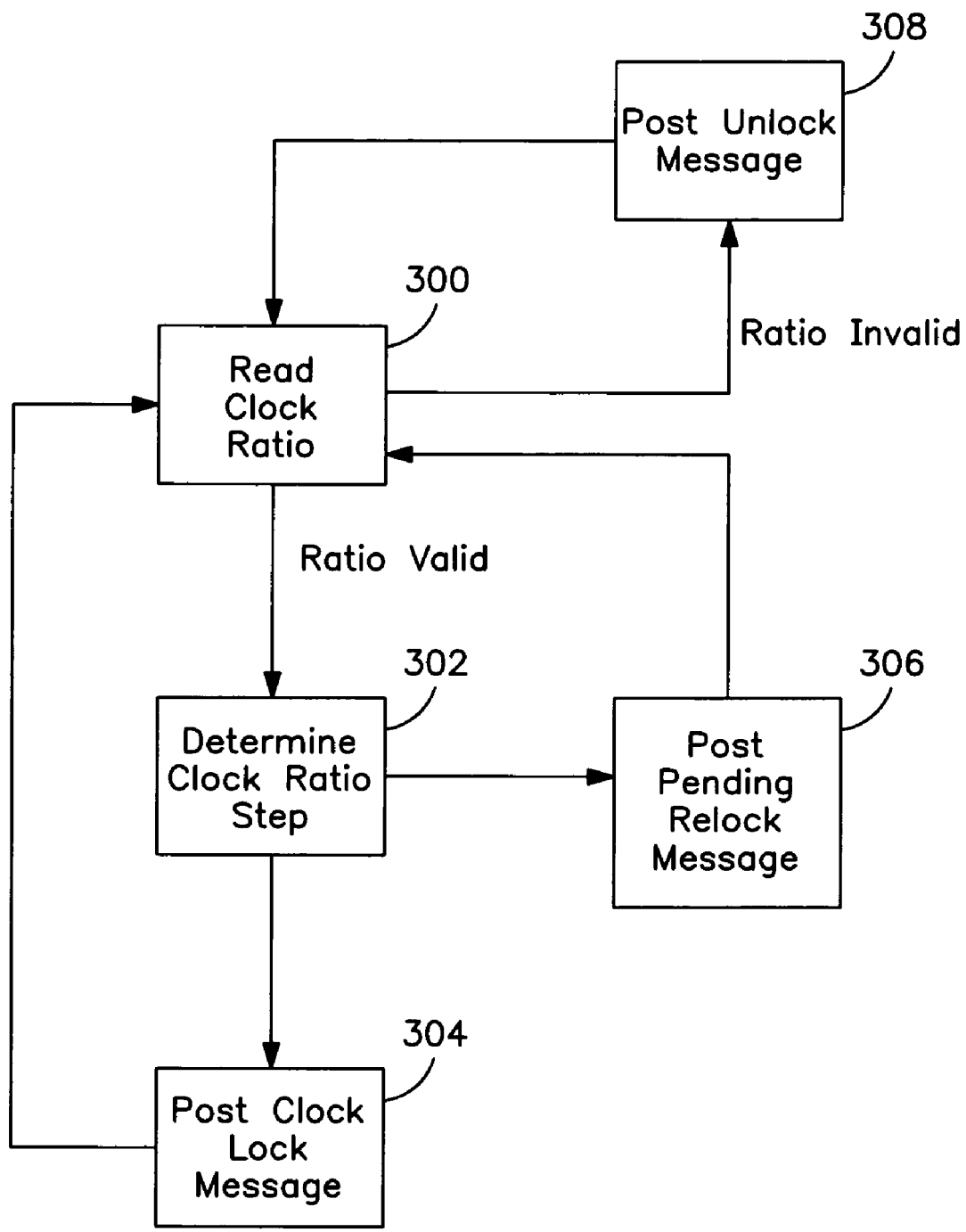
FIG. 3 illustrates a sequence of steps executed in accordance with the present invention.

Directing attention to FIG. 3, a sequence of steps in accordance with the present invention is shown. After an anchor clock ratio reading is performed as described above, control begins at step 300, in which the clock ratio is read. If the clock ratio is considered valid, control transitions to step 302, where a determination is made as to whether or not a clock ratio step has occurred. If the clock ratio step is within an acceptable variation, control transitions to step 304, where audio driver 102 posts a clock lock message is to platform interface 110. An example of one valid ratio value jumping to another valid ratio value is where the external sampling rate in the digital in stream has changed. As long as one of the endpoint values is valid when the step occurs, it is assumed by system 100 that a re-lock is pending and system 100 remains muted. The current clock ratio is then cached for determining the next occurrence of a ratio step. Control transitions from step 304 back to step 300, where the next clock ratio is read. Returning to step 302, if it is determined that the clock ratio step is outside of a tolerance level, control transitions to step 306, where system 100 is muted to prevent audio artifacts from being heard, and a pending relock message is posted. Control transitions from step 306 back to step 300, where the next clock ratio is read. Returning to step 300, if the clock ratio is determined to be invalid, control transitions to step 308, where an unlock message is posted. Control transitions from step 308 back to step 300, where the next clock ratio is read.

As described above, system 100 obtains the clock ratio by polling periodically. When a re-lock message is posted, for example after step 306, polling may be limited by a threshold number or a timer to determine whether or not the re-lock is imminent, and, if not, system 100 is unmuted.

While a method and apparatus for determining the presence of a valid clock within an externally clocked digital audio input has been illustrated and described in detail, it is to be understood that many changes and modifications can be made to various embodiments of the present invention without departing from the spirit thereof.

What is claimed is:

1. A method for determining the presence of a valid clock within an externally clocked digital audio input stream, by:
   reading a first clock ratio from an audio digital input stream;
   determining that that the first clock ratio is valid;
   determining a clock ratio step from a stored clock ratio;
   if the determined clock ratio step is below a tolerance value then posting a clock lock message; and
   if the determined clock ratio step is beyond the tolerance value then posting a re-lock message and muting audio.

2. The method of claim 1, further comprising storing the first clock ratio.

3. The method of claim 1, further comprising ceasing the muting of audio if the determined clock ratio step is beyond the tolerance value.

4. The method of claim 3, wherein ceasing the muting is performed upon completion of a number polling iterations.

5. The method of claim 3, wherein ceasing the muting is performed upon expiration of a timer.

6. The method of claim 1, wherein reading the first clock ratio is performed through periodic polling of a hardware interface, the hardware interface in communication with an audio driver.

7. The method of claim 1, wherein posting a clock lock message comprises sending a clock lock indication to an audio driver.

8. The method of claim 1, wherein posting a relock message comprises sending a clock relock indication to an audio driver.

9. A computer readable apparatus comprising a storage medium adapted to store computer instructions which determine the presence of a valid clock within an externally clocked digital audio input stream, said instructions which, when executed by a computer:
   read a first clock ratio from an audio digital input stream;
   determine that that the first clock ratio is valid;
   determine a clock ratio step from a stored clock ratio;
   if the determined clock ratio step is below a tolerance value then post a clock lock message; and
   if the determined clock ratio step is beyond the tolerance value then post a re-lock message and mute audio.

10. An apparatus for determining the presence of a valid clock within an externally clocked digital audio input stream:
    means for reading a first clock ratio from an audio digital input stream;
    means for determining that that the first clock ratio is valid;
    means for determining a clock ratio step from a stored clock ratio;
    means for posting a clock lock message when a determination is made that a determined clock ratio step is below a tolerance value; and
    means for posting a relock message and muting audio if a determination is made that a clock ratio step is beyond the tolerance value.

11. A method for determining the presence of a valid clock within an externally clocked digital input stream, comprising steps of:
    reading the first clock ratio from the digital input stream;
    determining that that the first clock ratio is valid;
    determining a clock ratio step from said first clock ratio and a second clock ratio provided by another source;
    determining if said clock ratio step is within a prescribed range;
    locking the clock when said clock ratio step is within said prescribed range; and
    posting a re-lock message and temporarily suspending the decoding of said input digital stream when said clock ratio step is outside said prescribed range.

12. The method of claim 11, further storing the first clock ratio.

13. The method of claim 11, further comprising resuming the decoding of said input digital stream if said clock ratio step meets a criterion with respect to the prescribed range.

14. The method of claim 13, wherein said resuming of the decoding is performed upon completion of a number polling iterations.

15. The method of claim 13, wherein said resuming of the decoding is performed upon expiration of a timer.

16. The method of claim 11, wherein said reading the first clock ratio is performed through periodic polling of a hardware interface, the hardware interface in communication with an audio driver.

17. The method of claim 11, wherein the locking of the clock comprises sending a clock lock indication to an audio driver.

18. The method of claim 11, wherein said posting a relock message comprises sending a clock relock indication to an audio driver.

19. A computer readable apparatus comprising storage medium containing instructions which determine the presence of a valid clock within an externally clocked digital input stream, said instructions which, when executed:
    read and validate a first clock ratio from a digital input stream;
    determine a clock ratio step from said first clock ratio and a second, previously determined clock ratio;
    lock the clock when said clock ratio step is within a prescribed range; and
    post a re-lock message and temporarily suspend decoding of said input digital stream when said clock ratio step is outside said prescribed range.

20. An apparatus configured to determine the presence of a valid clock within an externally clocked digital input stream, said apparatus comprising:
    a first module adapted to read a first clock ratio from a digital input stream;
    a second module adapted to determine a clock ratio step from said first clock ratio and a second clock ratio obtained at another time; and
    a third module adapted to:
       determine whether said clock ratio step is within a prescribed range;

lock the clock when said clock ratio step is within said prescribed range; and post a relock message and temporarily suspend the decoding of said input digital stream when said clock ratio step is outside said prescribed range.

21. The apparatus of claim 20, further comprising apparatus configured to store the first clock ratio.

22. The apparatus of claim 20, further comprising apparatus configured to resume the decoding of said input digital stream when said clock ratio step is outside prescribed range.

23. The apparatus of claim 22, wherein said resumption of decoding is performed upon completion of a number polling iterations.

24. The apparatus of claim 22, wherein resumption of decoding is performed upon expiration of a timer.

25. The apparatus of claim 20, further comprising an audio driver and a hardware interface in communication with said audio driver, and wherein said first module reads the first clock ratio via at least periodic polling of said hardware interface.

26. The apparatus of claim 20, further comprising an audio driver, and wherein said locking of the clock comprises sending a clock lock indication to said audio driver.

27. The apparatus of claim 20, further comprising an audio driver, and wherein posting a relock message comprises sending a clock relock indication to said audio driver.

* * * * *

UNITED STATES PATENT AND TRADEMARK OFFICE
CERTIFICATE OF CORRECTION

PATENT NO. : 7,710,294 B2
APPLICATION NO. : 11/551010
DATED : May 4, 2010
INVENTOR(S) : Anthony Guetta et al.

Page 1 of 1

It is certified that error appears in the above-identified patent and that said Letters Patent is hereby corrected as shown below:

In column 3, line 27, in Claim 1, before "the" delete "that".

In column 3, line 58, in Claim 9, before "the" delete "that".

In column 4, line 1, in Claim 10, before "the" delete "that".

In column 4, line 14, in Claim 11, before "the" delete "that".

Signed and Sealed this
Fifteenth Day of November, 2011

David J. Kappos
*Director of the United States Patent and Trademark Office*